UNITED STATES PATENT OFFICE.

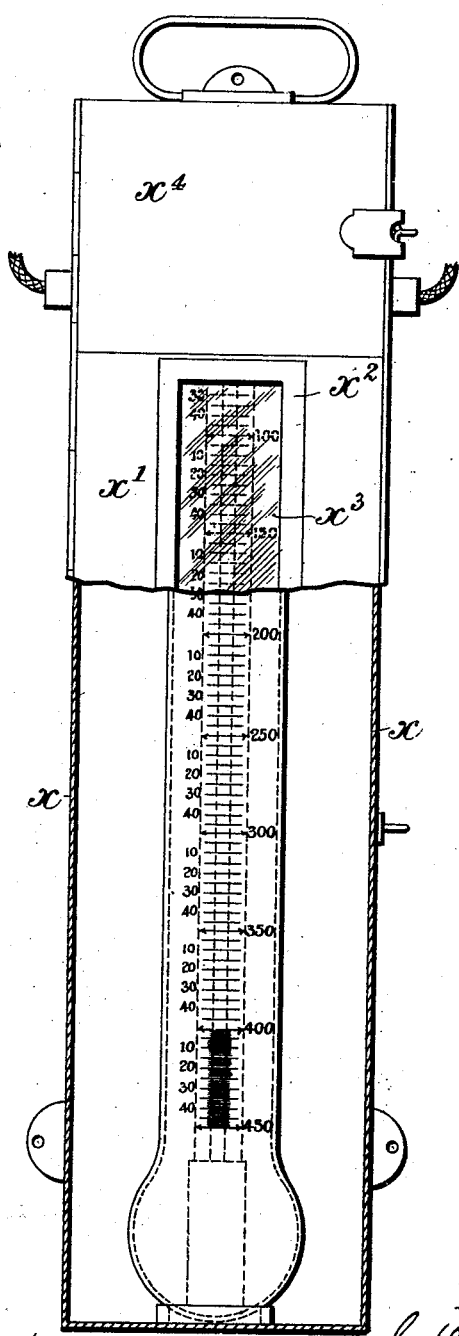

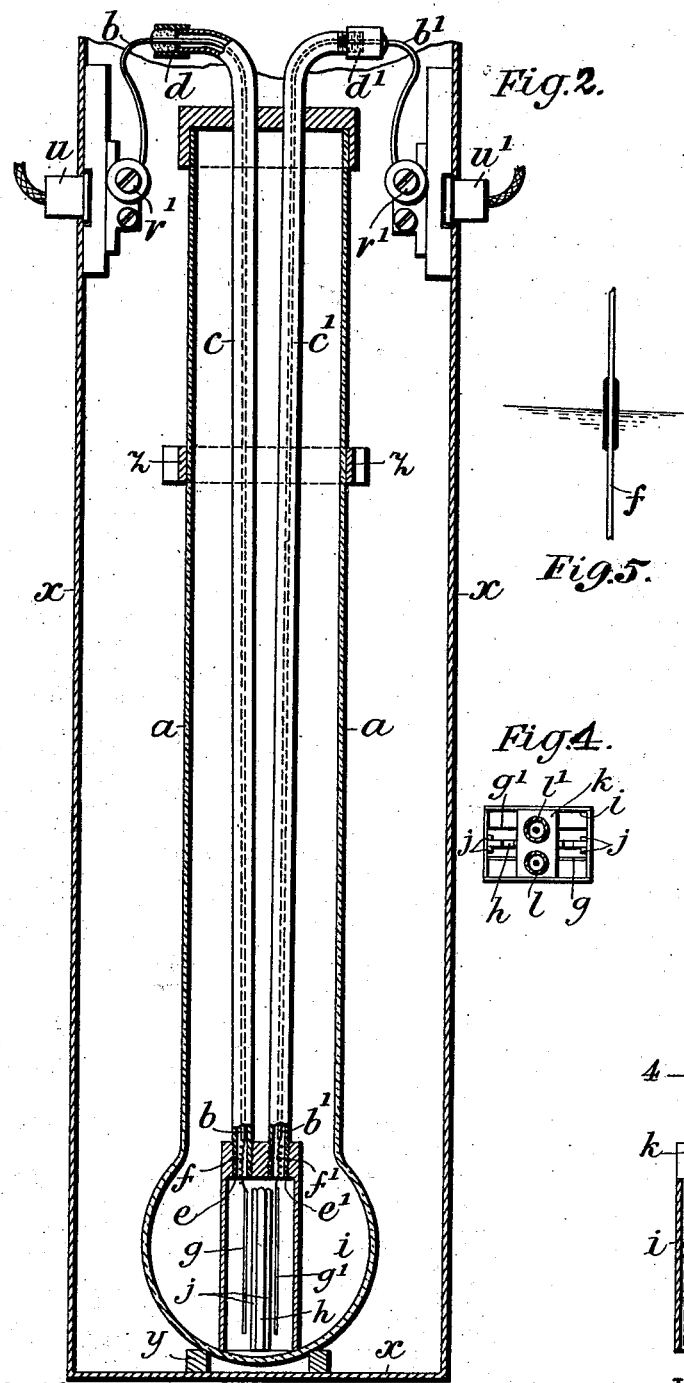

CHARLES O. BASTIAN, OF LONDON, ENGLAND.

ELECTROLYTIC ELECTRICITY-METER.

SPECIFICATION forming part of Letters Patent No. 693,216, dated February 11, 1902.

Application filed October 14, 1901. Serial No. 78,606. (No model.)

*To all whom it may concern:*

Be it known that I, CHARLES ORME BASTIAN, electrical engineer, managing director of the Bastian Meter Company, Limited, of Bartholomew Works, Kentish Town, London, a subject of the King of Great Britain, residing at 37 Streatley road, Brondesbury, London, England, (whose post-office address is 37 Streatley road, London, England,) have invented certain new and useful Improvements in or Relating to Electrolytic Electricity-Meters, of which the following is a specification.

This invention relates to improvements in methods of preventing melting or overheating of certain portions of the conductors of electrolytic apparatus, especially electrolytic meters of the "Bastian" type, where a falling column of electrolyte is employed. It has been found that such conductors on an excess of current being passed therethrough are liable to become considerably more heated at the surface of the electrolyte or at the point where the conductors enter the latter or first or last make contact therewith than at any other portion of their length—*i. e.*, at the point where the conductor emerges from the electrolyte and first meets the surrounding air or other gases, or, vice versa, where the air or other gas last meets the conductor as the latter enters the electrolyte.

The invention consists in localizing and keeping constant the point in electrolytic meters of the above character where the electrode-conductors enter or leave the electrolyte and preventing the melting or overheating of the said conductors at such point by leading one or both conductors through the body of the electrolyte, each in a casing hermetically sealed at the upper end and open at the lower end, whereby the electrolyte will be excluded from said casing, (and consequently from the conductors therein,) on the principle of the well-known "diving-bell," and at or near the open end of said casing locally insulating the said conductors or enlarging their cross-sectional area, or both.

A meter embodying my invention is shown in the accompanying drawings, in which similar letters refer to similar parts throughout the several views.

Referring to the drawings, Figure 1 represents an electrolytic meter of the Bastian type above referred to with the lower part of the door or cover removed. Fig. 2 is an elevation, on an enlarged scale, partly in section, of said meter, showing the application thereto of the present invention. Fig. 3 is an elevation, partly in section, of the electrical conductors and electrodes removed from the vessel for holding the electrolyte. Fig. 4 is a section taken on line 4 4, Fig. 3; and Fig. 5 is an enlarged detail view of one of the electrode-conductors, showing the manner of insulating the same at the point where it emerges from the electrolyte.

$a$ is the vessel for holding the electrolyte.

$b\ b'$ are the conductor-wires, (of any suitable material, advantageously lead, on account of cheapness,) which are led in from above through the open top of the electrolytic vessel $a$ down to the bottom or nearly to the bottom of said vessel $a$, each said wire $b\ b'$ being separately inclosed in a coating or covering $c\ c'$ of any suitable insulating material, such as vulcanite, which latter is hermetically sealed around each conducting-wire $b\ b'$, advantageously at a point above the highest level to which the electrolyte reaches in said vessel $a$. For instance, this hermetical seal may be at the point $d\ d'$, where the wires $b\ b'$ extend beyond the top of said electrolytic vessel $a$, and such coverings $c\ c'$ of insulating material terminate at a point $e\ e'$ near the lower end of each conducting-wire and close to where same are connected up to their respective electrodes $g\ g'$. The lower end of each lead conducting-wire $b\ b'$ terminates within and near the bottom end $e\ e'$ of said casing $c\ c'$ (see Fig. 3) and is connected up to a platinum wire $f\ f'$, the other end of each said platinum wire being connected to its respective electrode $g\ g'$, such electrodes being suspended and mounted simply by means of said platinum wires $f\ f'$ and prevented from coming in contact with one another by any suitable means, such as bars or an open-work frame or barrier, which must be of such a character as to freely permit the electric current to flow between the electrodes. For instance, a grid-like barrier $h$ may be mounted (in a fixed position between said electrodes $g\ g'$) in the rigid box or casing $i$, which may be formed of vulcanite or other suitable material which will be unaffected by the electrolyte, which box or casing $i$ is open at both its top and bottom ends (and may also be perforated at its sides, if desired) and may be provided on the interior vertical side walls thereof with guideways $jj$, in which the barrier $h$ is adapted to fit tightly. The upper part of this box or case $i$ for protecting the electrodes $g\ g'$ is provided with a stout cross head or bar $k$, having vertical openings $l\ l'$ therethrough, which latter may be internally screw-threaded and adapted to receive therein the lower ends $e\ e'$ of the insulated casing $c\ c'$, which latter would be externally screw-threaded for this purpose. The electrodes $g\ g'$, attached to the short platinum wires $ff'$, are thus located (loosely) in said open-ended box $i$, or any other suitable open-work frame or protecting-casing may be employed which while protecting the electrodes will permit free access of the electrolyte to the electrodes in the interior of said box $i$ or other protecting frame or casing. Thus it will be seen that the platinum wires $ff'$ connect the lead wires $b\ b'$ to the electrodes $g\ g'$.

When this system is placed in position in an electrolytic vessel, such as $a$, and immersed in the electrolyte therein, the electrolyte is prevented from reaching or prejudicially affecting the lead conducting-wires $b\ b'$ by reason of the air around said wires $b\ b'$ in said casing $c\ c'$ being unable to escape from the upper end of said casing, and consequently such air will prevent the electrolyte reaching the lead conductors $b\ b'$, or, if said electrolyte should reach the lead conductors $b\ b'$ within said casing $c\ c'$, as soon as the electric current passes through said conductors gas will be given off, which latter rises up inside said covering $c\ c'$ and is unable to escape from the upper part of said covering $c\ c'$, (owing to same being hermetically sealed at the upper end, as aforesaid.) Consequently said gases as they accumulate will force down the electrolyte below the lower end of said lead conductor-wires $b\ b'$, the gases remaining within the said coverings $c\ c'$, thus keeping the electrolyte from rising within said coverings. Thus the electrolyte is prevented from reaching the lead conductor-wires $b\ b'$, on the well-known diving-bell principle. Furthermore, by this invention I localize the point where the melting of the conductors would otherwise be liable to occur. By the arrangement shown such point would be confined—*i.e.*, localized—on the conductors at or near the lowermost open end $e\ e'$ of the casings $c\ c'$ for said conductors, and I prevent the melting or overheating occurring at this local point on said conductor by locally insulating one or both of said conductors at this said particular point, and any suitable insulating material may be used, according to the nature of the electrolyte employed. For instance, in carrying out this part of the present invention with an electrolytic electricity-meter of the character shown in the drawings hereunto annexed the excessive heating would be liable to arise in one or other of the platinum wires $ff'$ at the point where they enter or leave the electrolyte, which point in practice would be at or about the level of the bottom ends $e\ e'$ of the casing $c\ c'$, as aforesaid, and in order to prevent such melting according to the present invention the platinum wires $ff'$ would be coated just at this point with suitable insulating material—such as acid-proof varnish, or a little paraffin-wax, or a coating of glass—say for an eighth of an inch on either side at such point, (see Fig. 5,) and by thus coating both the platinum wires $ff'$ this will enable the leading-in wires $b\ b'$ to be connected up indiscriminately, as whichever way same are connected up the negative platinum wire (whether it be $f$ or $f'$) being thus coated such coating will prevent melting thereof.

The electrolytic vessel $a$ (which may be calibrated, as shown in Fig. 1, or provided with a separate meter index or scale) is mounted in any suitable meter-case, such as $x$, (shown in Fig. 2,) the door $x'$ of which may have a vertical opening $x^2$ therein, provided with a glass window $x^3$ to enable readings or observations of the meter to be made without opening said meter-case, this hinged door $x'$, if desired, being divided into two parts $x'\ x^4$ and having any well-known or suitable means for locking and securing said door to prevent unauthorized persons obtaining access to the interior of said meter-case. The electrolytic vessel $a$ may be mounted and supported in said meter-case $x$ in any suitable manner. For instance, the lower end may rest on the support $y$ in the bottom of the meter-case $x$, and the upper part of said vessel $a$ may be embraced by the arms of a spring-clip $z$. (See Fig. 2.) Insulated nipples $u\ u'$ are mounted through the sides of the case $x$, through which the main circuit-wires lead to the contact-screws $v\ v'$ inside the meter-case $x$, the lead conducting-wires $b\ b'$ being readily attached to or detached from said contact-screws $v\ v'$ to thus connect the conductors to the main circuit.

Having now described my invention, what I claim as new, and desire to secure by Letters Patent of the United States, is—

1. In electrolytic meters, the method of preventing overheating or melting of one or more of the electrode-conductors, at the upper surface of the electrolyte, which consists in preventing the access of air or other gases to said conductors at said point, substantially as described.

2. In electrolytic meters, the method of preventing overheating or melting of one or more of the electrode-conductors at the upper surface of the electrolyte, which consists in locally insulating said conductors at said point, substantially as described.

3. In electrolytic meters, the method of preventing overheating or melting of one or more of the electrode-conductors at the upper surface of the electrolyte, which consists in keeping constant the point where the electrode-conductors enter the surface of the electrolyte, and insulating the said conductors at said point, substantially as described.

4. In electrolytic meters, of the character described, the method of preventing overheating or melting of one or more of the electrode-conductors at the upper surface of the electrolyte, which consists in keeping constant the point where the electrode-conductors enter the surface of the electrolyte, by fluid-pressure, and locally insulating said conductors at the point where they enter said electrolyte, substantially as described.

In witness whereof I have hereunto set my hand in presence of two witnesses.

CHAS. O. BASTIAN.

Witnesses:
FRANCIS W. FRIGOUT,
A. NUTTING.